United States Patent

Marti Sala

[11] Patent Number: 5,297,666
[45] Date of Patent: Mar. 29, 1994

[54] MACHINE FOR AUTOMATICALLY ORIENTING CONTAINERS

[76] Inventor: Jaime Marti Sala, C/Emancipación, 8, 08017 Barcelona, Spain

[21] Appl. No.: 11,752

[22] Filed: Feb. 1, 1993

[30] Foreign Application Priority Data

Jan. 30, 1992 [FR] France ................. 92 01246

[51] Int. Cl.$^5$ ............................................. B65G 47/24
[52] U.S. Cl. ................................. 198/380; 198/392; 198/397
[58] Field of Search ............... 198/380, 392, 397, 400; 221/157, 160, 167

[56] References Cited

U.S. PATENT DOCUMENTS

| | | | |
|---|---|---|---|
| 3,650,368 | 3/1972 | Nalbach | 198/33 AA |
| 3,835,985 | 9/1974 | Johnson | 198/397 |
| 4,681,209 | 7/1987 | Marti | 198/392 |
| 4,825,995 | 5/1989 | Nalbach | 198/380 |
| 5,031,748 | 7/1991 | Bianchini et al. | 198/380 |
| 5,065,852 | 11/1991 | Marti | 198/392 |

FOREIGN PATENT DOCUMENTS 2543926 10/1984 European Pat. Off. .
0192594 8/1986 European Pat. Off. .
2118880 8/1972 France .

OTHER PUBLICATIONS

Soviet Inventions Illustrated, Section A, 1966.

Primary Examiner—Joseph E. Valenza
Attorney, Agent, or Firm—Jacobson, Price, Holman & Stern

[57] ABSTRACT

A machine for orienting randomly arranged articles by a hopper bowl having a rotary bottom support. The rotary bottom support has peripherally spaced openings which permit downward discharge of the articles. An article support self extending below said openings prevents article passage through said openings until the articles arrive at a discharge location. Said article support self having a duct which connects a plurality of holes in said self with a negative air pressure source so that the articles are held against said self while they are in said peripheral openings.

5 Claims, 3 Drawing Sheets

MACHINE FOR AUTOMATICALLY ORIENTING CONTAINERS

BACKGROUND OF THE INVENTION

This invention relates to the field of machines for automatically orienting and continuously feeding containers, for example bottles or other hollow articles made from synthetic material, which may be of very different sizes and shapes. This machine is designed for continuous feeding of other machines such as high production filing machines or similar equipment.

Known machines of the type to which the present invention relates may include in general:

a) a hopper of any shape or dimension provided with an opening to receive in bulk containers that fall onto a bottom plane whose edges are at a distance from the side wall of the hopper providing a space allowing the passage of the containers.

b) a structure, provided with displacement means in enclosed circuit, located below the bottom plane, including, fully or in part:
a plurality of detachable container holding elements removable mounted at the periphery of the structure defining between their sides, the edge of the structure, and the hopper wall, a series of recesses adapted to receive containers in a lying position and provided with retaining means for one part of the containers, namely their neck, in such a way as to release them in a predetermined position, usually with the neck upward;
a plurality of discharge chutes provided under the recesses for receiving and transferring the containers, correctly oriented, towards an exit conveyor that feeds, for example, a bottling line;

c) a plane or shelf, which may be adjustable in height, located below the recesses and over the chutes, designed to support at least one main portion of the containers when they are conveyed by the holding elements defining the recesses for receiving and retaining them in a lying position, the plane or shelf being provided with an opening in an unloading area through which the containers drop when moved into position thereover by the container holding elements;

This plane or shelf designed to support at least one main portion of the containers is described in the following patents:

U.S. Pat. No. 3,650,368 (NALBACH): lateral fixed plane 82 that provides a support for the bottles during their rotation an has, at the upper part, an opening to pass the bottle that fall, by gravity, in an upright position into a chute located below the opening;

German patent 19 43 372 (HOFFCO): inclined helicoidal shelf 14 to retain the containers body, provided with a passage opening likewise at the higher part;

U.S. Pat. No. 4,681,209 (MARTI): inclined annular shelf 14 to retain the containers body, provided with a passage opening also at the higher part;

U.S. Pat. No. 5,065,852 (MARTI): horizontal annular shelf 11 to retain the containers body, provided with a passage opening in an unloading area.

In these different machines, the containers only rest by gravity on the said planes or shelves. As they are essentially light containers their remaining on the said planes is more specifically problematical the higher the speed of the machines is. Thus a limitation of the related machines operating speed and a drop of their efficiencies by a low rate of filling of the related receiving recesses with frequent stops for those of them which have no available device to evacuate the wrongly positioned containers.

BRIEF SUMMARY OF THE INVENTION

In order to solve the above problems the invention aims to execute a device having the effect to ease the entering and placing of the containers in their related recesses and to keep them at the bottom of these latter even at very high operating speeds.

To achieve these results, the said plane or shelf designed to support the containers when they are conveyed by the holding elements defining the recesses for receiving and retaining them in a lying position, is carried out from a duct connected through tubes to a source of negative pressure and provided in the wall acting as supporting plane for the containers with a plurality of holes, or perforations, suitable to cooperate, through the air they suck, to the positioning and upholding of the containers in the said peripheral recesses.

According to a first embodiment of the invention, the said duct includes likewise an upper extension, which constitutes a wall surrounding the peripheral zone aimed to receive the containers from the loading area to the unloading area, which also includes, close to and above each of the recesses, a plurality of holes suitable to cooperate, through the air they suck, to the passage of the containers inside the said recesses and to keep them when moving toward the falling area.

According to a second embodiment of the invention, the air sucked by the said duct is channelled and recycled as pressurized air toward an injection duct, provided with holes, above the peripheral area, along the path of the said recesses, to cooperate to the passage and upholding of the containers inside the said recesses.

The advantages and features of the present invention will become more apparent from following description of certain preferred embodiments thereof.

BRIEF DESCRIPTION OF THE DRAWINGS

The invention will now be described in detail with reference to the accompanying drawings wherein.

DETAILED DESCRIPTION

Figure 1:
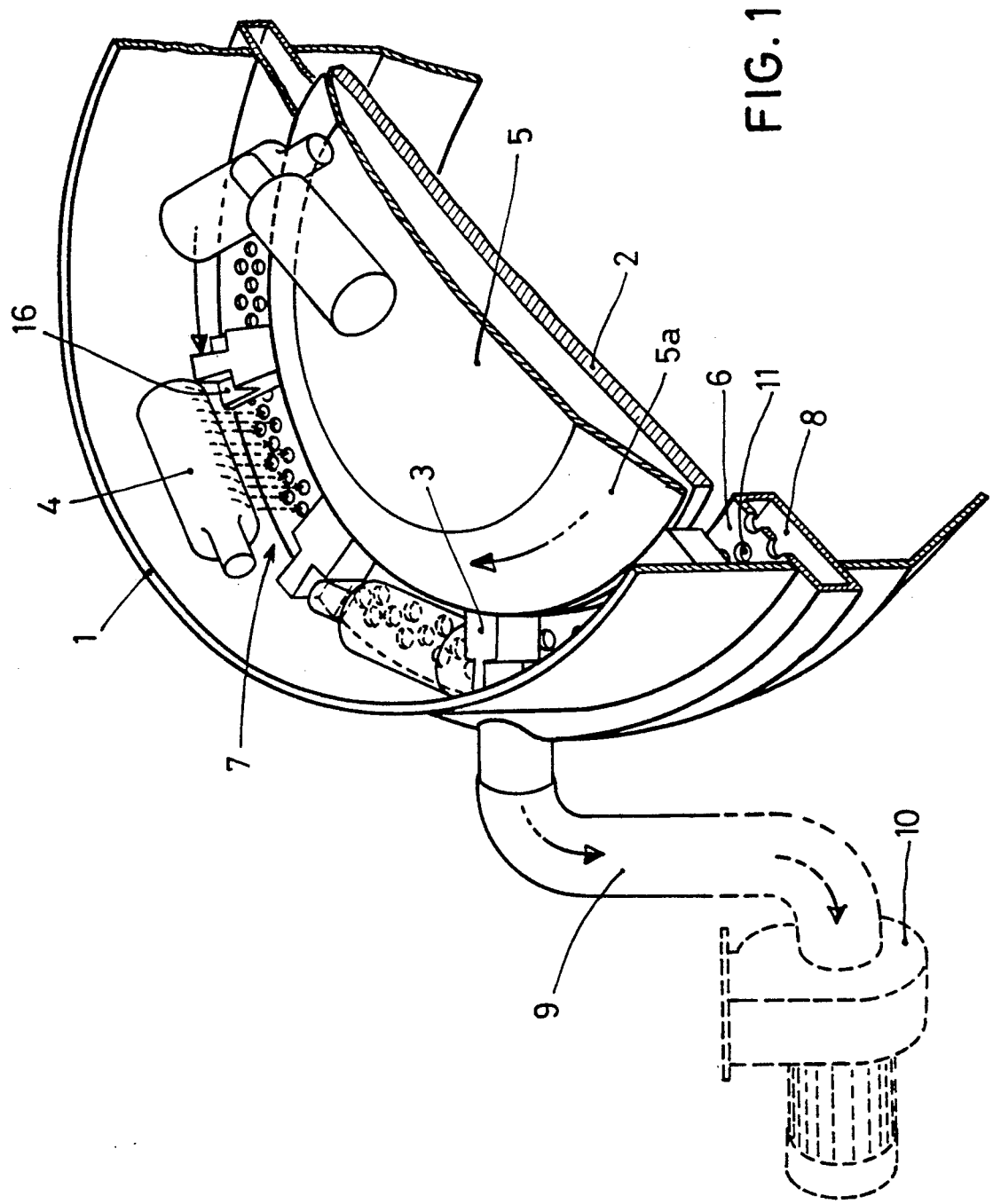
FIG. 1 is a fragmentary perspective view of the device according to the invention adapted on a machine of the type involved.

The machine shown in FIG. 1 includes:
a cylindrical hopper 1;
a rotary disk 2 located at its bottom;
container holding elements 3, detachably fixed to the periphery of the disk 2, which define two by two receiving recesses 7 adapted to receive containers 4 in a lying position, and provided with retaining means 16 for one part of the containers, namely their neck 4a;
a stirrer 5 constituting a part of the hopper bottom plane said stirrer 5 including a main surface to receive in bulk containers 4 that fall onto it and an inclined peripheral surface 5a which assists, in combination with the rotation of the said stirrer 5 in a sense opposite to that of the movement of the peripheral recesses 7 supporting the containers 4, to distribute said containers 4 in the said peripheral recesses 7 along a loading area.

a supporting plane or shelf 6, pertaining to a duct and provided with holes 11 which serve, through the air they suck to position and keep the containers 4 in the recesses 7, said duct being connected through tubes 9 to a source of negative pressure 10.

Figure 2:
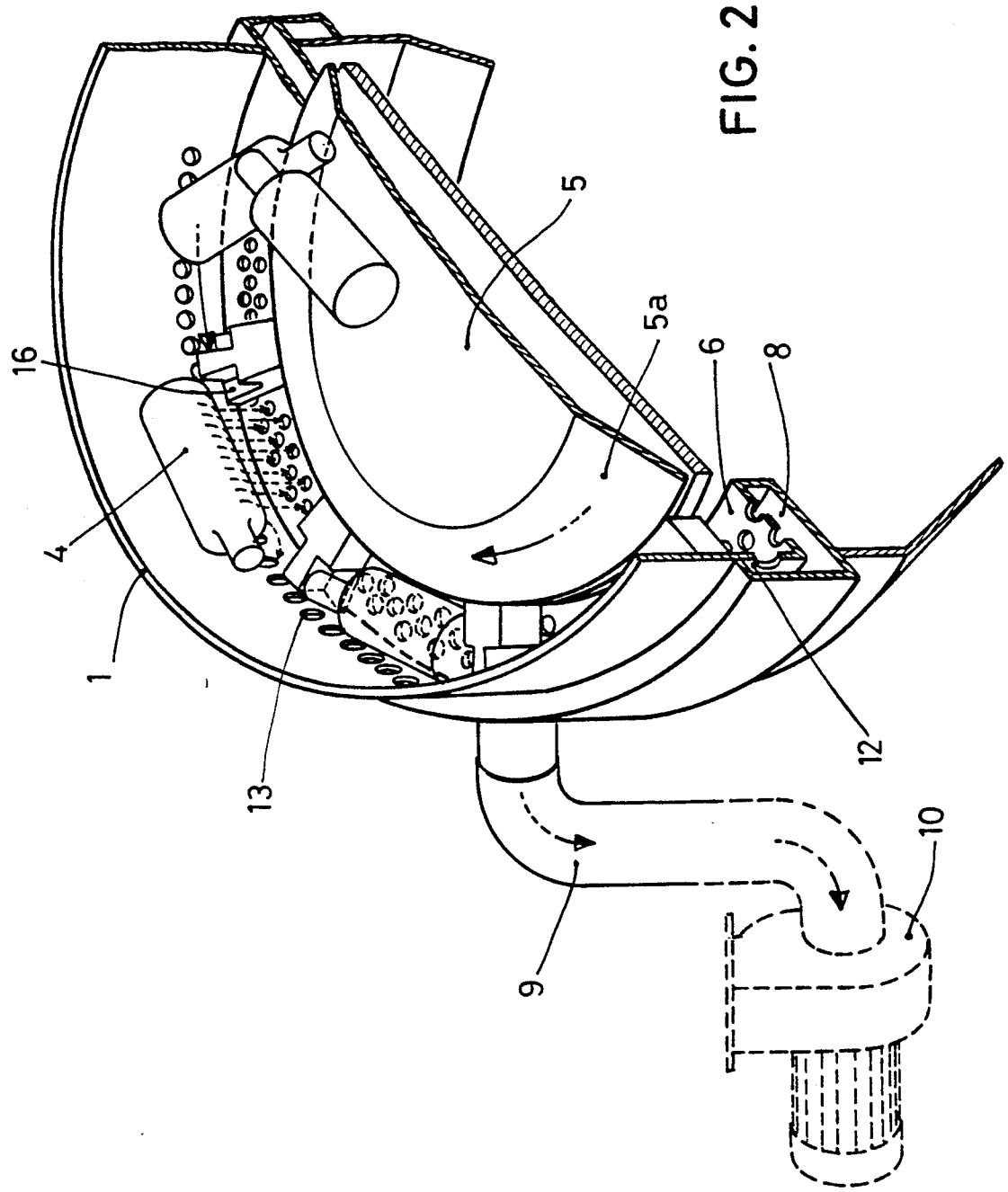
FIG. 2 is a fragmentary perspective view of a first variant of the invention.

The machine shown in FIG. 2 constitute a first variant of the former in which the duct 8 includes an upper extension forming a hollow tube 12 also provided in the wall close to and above each recess 7, with a plurality of passing holes 13 which are added to the former 11, to improve the efficiency of the machine involved.

Figure 3:
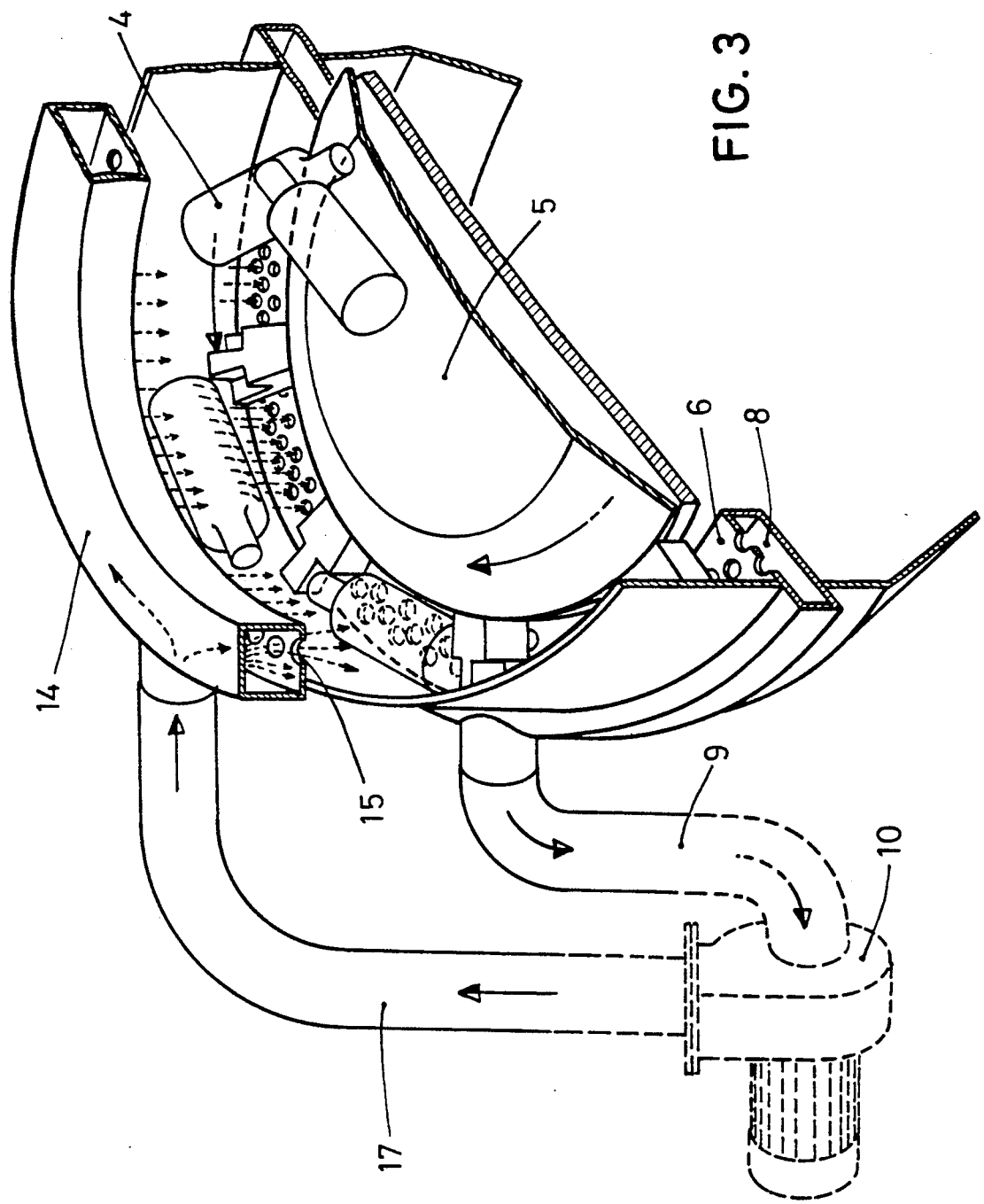
FIG. 3 is a fragmentary perspective view of a second variant of the invention.

The machine shown in FIG. 3, constitutes a second variant of the machine in FIG. 1, and further comprises a second duct 14, fed with recycled pressurized air coming from the exhaust of the source 10, through a pipe 17, said duct 14 including injection holes 15 above the peripheral area, along the path of the said recesses 7 which cooperate to the passage and the upholding of the containers 4 in the said recesses 7.

According to other variants of the invention:

each duct 8, 12, 14 can be carried out in several juxtaposed elements;

each duct 8, 12, 14, can include, before a containers unloading area, a sector having no perforation available, corresponding to an area of evacuation of the containers wrongly positioned in the recesses.

These different devices can fit any machine designed to positioning containers to feed a bottling station or similar equipment and, namely, machines which have, attached with the internal wall of the hopper 1, a wall opposite to the inclined surface 5a of the stirring disk 5, in such a way that between both planes a passage is defined which equals, with a small tolerance the width of the containers, all of which determines that containers can reach the recesses 7 only in a lying state and singly, which improves the performance of the machine avoiding jams as described in the cited U.S. Pat. No. 4,681,209.

I claim:

1. Machine for automatically orienting containers, such as plastic bottles, comprising:
    a hopper for receiving a plurality of randomly positioned containers;
    a side wall on said hopper;
    a bottom in said hopper having a peripheral portion spaced from said side wall to provide a space through which containers on said bottom can pass;
    container holder support means having a peripheral portion and supported below said hopper for movement of said peripheral portion thereof in a path adjacent said peripheral portion of said bottom;
    means for driving said container holder support means in said path;
    container holder means mounted on said container holder support means for movement therewith and forming recesses for receiving and holding the containers in a lying position from said peripheral portion of said bottom;
    discharge openings in said container holder means for allowing the containers to pass therethrough;
    a container support shelf means extending below said holders for supporting the containers in a lying position in said receiving recesses during movement of said container holder means;
    a discharge section in said support shelf means for discontinuing support of the containers at a predetermined location so that containers in said container holder means pass through said openings at said discharge section;
    tilting means on said container holder means engaging one part of each container for tilting the container into a predetermined position as the container passes through said openings at said discharge section;
    chute means mounted below and movable with said discharge openings for receiving, orientating and guiding containers passing through said discharge openings into a predetermined position, each chute means having a lower exit portion;
    said container support shelf means for supporting the containers in a lying position in said receiving recesses is carried out from a duct connected through at least one conduit to a source of negative pressure and provided in a wall acting as support plane for the containers with a plurality of holes suitable to cooperate, through the air they suck, to the positioning and upholding of the containers inside said peripheral recesses.

2. Machine, as claimed in claim 1 and further comprising:
    an upper extension of said duct constituting said support shelf means, forming a hollow tube with an inner side wall surrounding the peripheral zone aimed to receive the containers from a loading area to an unloading area;
    a plurality of passing holes in said inner side wall of said hollow tube close to and above each of the receiving recesses, suitable to cooperate, through the air they suck, to the passage of the containers towards said recesses and to keep them in that place when moving toward the falling area.

3. Machine, as claimed in claim 1 and further comprising:
    an injection duct, provided with holes, above the peripheral area, along the path of said recesses, receiving the air sucked by said duct forming the container support shelf means, which air is channelled and recycled as pressurized air toward said injection duct from said source of negative pressure, to cooperate to the passage and upholding of the containers in said peripheral recesses.

4. Machine, as claimed in any one of claims 1 to 3, wherein:
    each duct can be carried out in several juxtaposed elements.

5. Machine, as claimed in any one of claims 1 to 3, wherein:
    each duct can include, before the containers unloading area, a sector having no perforation, corresponding to an area of evacuation of the containers wrongly positioned in said peripheral recesses.

* * * * *